Jan. 26, 1943.  R. I. GEIGER  2,309,307
BALL AND SOCKET CONNECTOR
Filed June 4, 1941

INVENTOR.
Ralph I. Geiger
BY C. Lauren Maltby
ATTORNEY

Patented Jan. 26, 1943

2,309,307

UNITED STATES PATENT OFFICE 2,309,307

BALL AND SOCKET CONNECTOR

Ralph I. Geiger, Los Angeles, Calif.

Application June 4, 1941, Serial No. 396,549

6 Claims. (Cl. 287—21)

This invention relates to ball and socket joint structures and more especially to the same having quick release features.

This application is a continuation-in-part of co-pending applications Serial No. 276,605, filed May 31, 1939, now Patent No. 2,271,136 dated January 27, 1942, and Serial No. 315,573 filed January 25, 1940.

An object of the invention is to provide a simple, practical, and efficient ball and socket structure of the character described.

Another object is to provide a quick release adjustable ball socket joint adapted for a variety of uses.

Another object of the invention is to provide a ball and socket joint having novel means for limiting the movement of the ball element.

Other objects will appear and be brought out more fully in the following specification, reference being had to the accompanying drawing, wherein.

Figure 1:
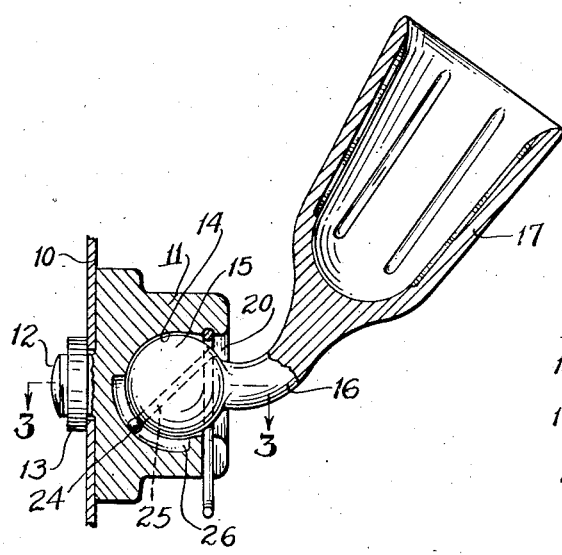
Fig. 1 is a sectional view of a ball and socket joint embodying my invention, and showing a fisherman's rod butt socket to which the invention is applicable.
Figure 2:
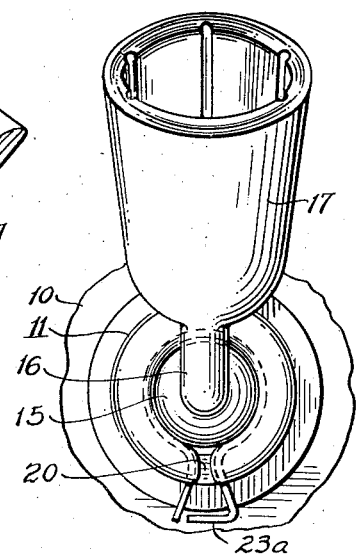
Fig. 2 is a front view of the same.
Figure 3:
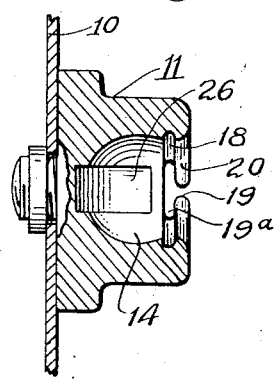
Fig. 3 is a sectional view of the socket element taken along line 3—3 of Fig. 1.
Figure 4:
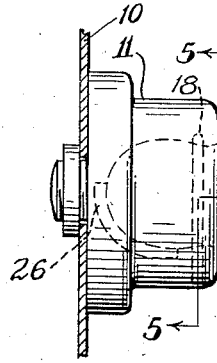
Fig. 4 is an elevational side view of the socket element.
Figure 5:
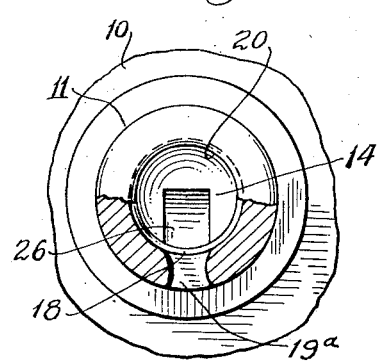
Fig. 5 is a front view of the same partly in section taken along line 5—5 of Fig. 4.
Figure 6:
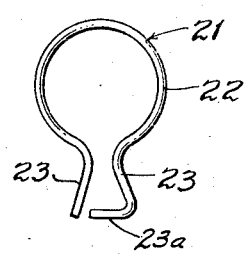
Fig. 6 is a front view of a spring clip.

Referring more particularly to the drawing, I show a socket element 11, having a threaded stud portion 12, which extends through an aperture in a plate 10 and is secured thereto by a nut 13. Element 11 has a spherical recess 14, adapted to receive a ball 15, secured to a shank 16, of a rod butt socket 17. An annular groove 18 is formed in element 11, and a slot 19 having a locking portion 19a in groove 18 is formed in a portion of an annular opening 20 of recess 14. A resilient wire retainer 21 has an annular portion 22 adapted to fit in groove 18, and a pair of radial extensions 23 which upon being compressed will pass through slot 19 into locking slots 19a and permit the annular portion 22 to be fitted into and withdrawn from groove 18 for securing ball 15 in spherical recess 14, by which the ball is retained in the socket. One of the extensions 23 is provided with an angularly bent end 23a which extends over to the other extension 23 and prevents compression of annular portion 22 by a freezing and turning action of the ball thereagainst, and the annular portion 22 can only be inserted into or removed from the groove 18 by a twisting or spiral action provided by bending end 23a upwardly. It will thus be seen that retainer 21 is self-locking and will be held securely in place by radial extensions 23 which seat against the inner side of locking slots 19a, and the natural expansion of annular portion 22 will cause the same to seat firmly in groove 18, and any outward movement of ball 15 will cause the same to seat annular portion 22 more firmly in groove 18, since the depth of groove 18 is substantially less than the diameter of the wire of retainer 21.

In order to prevent complete rotation of rod butt socket 17, a small ball 24 is suitably secured as by a pin 25 to ball 15, and a flat groove 26 is formed in a portion of spherical recess 14, which keeps ball 15 from a complete rotation and limits the movement of rod butt socket 17, which however can be swung vertically and laterally within the limits determined by groove 26.

Figure 7:
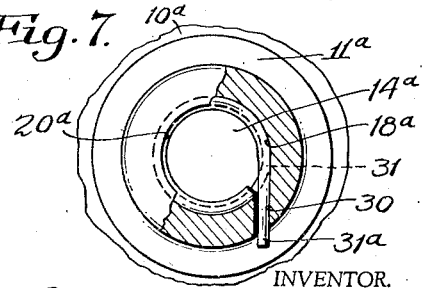
Fig. 7 is a cross sectional view of a modified form of socket and ball securing element.

In Fig. 7 I show a modified form of socket and ball securing element wherein it is indicated socket element 11a having a spherical recess 14a and an annular opening 20a, a circular groove 18a is formed in recess 14a, and a tangential bore 30 extends from groove 18a through socket element 11a. A soft bendable wire 31 is adapted to be inserted through bore 30 into groove 18a after the ball element has been positioned in recess 14a, and the retainer will follow the curve of the groove around as indicated. End 31a of the retainer may be left externally to facilitate removal, if desired. thus holding the ball element in the socket, since the diameter of the wire of retainer 31 is substantially greater than the depth of groove 18a.

Having described my invention, what I claim is:

1. A ball and socket device as described comprising a shank having a ball end, a socket element having a spherical recess and an annular groove of circular section adjacent the opening of said recess, said socket element having a slot extending through a portion of said groove and locking portions extending along the arc of said groove, and a ball locking member having a portion adapted to fit partially in said groove and having an extension portion adapted to be passed through said slot into said locking portion thereof, said slot being substantially the width of said extension portion whereby to prevent accidental or unintentional removal of said ball from said recess.

2. A ball socket device as described having a spherical recess and an annular groove adjacent the opening of said recess, there being a bore in said socket device extending tangentially from said annular groove, said bore and groove adapted to receive a bendable ball retaining element.

3. A ball socket device as described having a spherical recess and a circular opening thereto, said recess having an annular groove adjacent said opening, there being a bore in said socket device extending tangentially from said annular groove, said bore and groove adapted to receive a ball retaining element, comprising a section of wire.

4. A ball and socket device as described comprising a socket element having a spherical recess in an outer face portion thereof, a ball element having a shank extending from a radial point thereon, there being a groove in said recess positioned so as to be free from intersection by a spherical axis perpendicular to the plane of said outer face, and rotation limiting means for said ball comprising a projection thereon offset from a diameter extending through said radial point and extending into said groove, and means to secure said ball in said socket element.

5. A ball and socket device as described comprising a socket element having a spherical recess, a ball element in said recess having limited freedom of rotation about three mutually perpendicular axes and means to retain said ball element in said recess.

6. A ball and socket device as described comprising a socket element having a spherical recess and an annular groove of circular section adjacent the opening of said recess, said socket element having a radial slot extending inwardly with respect to said opening through said groove and having a pair of locking portions extending along the arc of said groove, a resilient locking member having an annular portion adapted to seat partially in said groove and having a pair of radial extension portions adapted to be passed consecutively through said slot into the groove locking portions thereof, one of said extension portions being bent angularly to engage the other of said extension portions when said extension portions are seated in said groove locking portions whereby to prevent accidental or unintentional removal of a ball from said recess, and facilitate manual insertion and removal of said resilient locking member in and out of said groove.

RALPH I. GEIGER.